United States Patent US 9,174,545 B2
Nishio (45) Date of Patent: Nov. 3, 2015

(54) VEHICLE CHARGING DEVICE (75) Inventor: Tsuyoshi Nishio, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 159 days.

(21) Appl. No.: 14/005,860

(22) PCT Filed: Mar. 28, 2012

(86) PCT No.: PCT/JP2012/002152
§ 371 (c)(1),
(2), (4) Date: Sep. 18, 2013

(87) PCT Pub. No.: WO2012/132430
PCT Pub. Date: Oct. 4, 2012

(65) Prior Publication Data
US 2014/0009114 A1 Jan. 9, 2014

(30) Foreign Application Priority Data

Mar. 30, 2011 (JP) ................ 2011-075791

(51) Int. Cl.
H02J 7/00 (2006.01)
B60L 11/18 (2006.01)
H02J 3/14 (2006.01)
H02J 7/04 (2006.01)

(52) U.S. Cl.
CPC ......... B60L 11/1809 (2013.01); B60L 11/1844 (2013.01); H02J 3/14 (2013.01); H02J 7/045 (2013.01); H02J 2003/143 (2013.01);
(Continued)

(58) Field of Classification Search
CPC . Y02T 10/7061; Y02T 10/6278; H02J 17/00; H02J 5/005; H02J 7/0008; H02J 7/0042; H02J 7/0006; H02J 7/025; H02J 7/0013; H02J 7/0029; H02J 7/0031; H02J 7/0052; H02J 7/0055; H02J 7/1423
USPC .................................................. 320/105–112
See application file for complete search history.

(56) References Cited

U.S. PATENT DOCUMENTS

2008/0203975 A1* 8/2008 Burlak et al. ............... 320/161
2009/0254290 A1 10/2009 Kim et al.
2010/0244777 A1 9/2010 Toyota
2012/0098498 A1* 4/2012 Asai .......................... 320/134

FOREIGN PATENT DOCUMENTS

CN 101551444 A 10/2009
JP 2003-092829 A 3/2003
(Continued)

OTHER PUBLICATIONS

International Search Report for PCT/JP2012/002152 dated Apr. 24, 2012.

Primary Examiner — Binh Tat
(74) Attorney, Agent, or Firm — Pearne & Gordon LLP (57) ABSTRACT Provided is a vehicle charging device (170) that uses a power source (101) outside of a vehicle (160) to charge a battery (115) installed in the vehicle (160). A charger (114) charges the battery (115). A voltage measurement unit (111) measures the input voltage corresponding to the input current in the charger (114). A current measurement unit (112) measures the input current (Ic) in the charger (114). A control unit (113) changes the input currents (Ic) of the charger (114) into a plurality of values, and controls the input current (Ic) when the input voltage (Vc) has changed, according to the corresponding relationship between the input currents (Ic), when each has been changed, and the measured input voltages (Vc).

6 Claims, 7 Drawing Sheets (52) U.S. Cl.
CPC .......... *Y02B70/3225* (2013.01); *Y02B 70/3266* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y02T 90/163* (2013.01); *Y04S 10/126* (2013.01); *Y04S 20/222* (2013.01); *Y04S 20/242* (2013.01)

(56) References Cited

FOREIGN PATENT DOCUMENTS

| JP | 2011-128010 A | 6/2011 |
|----|---------------|--------|
| WO | 2012/008392 A1 | 1/2012 |
| WO | 2012/017985 A1 | 2/2012 |

* cited by examiner

VEHICLE CHARGING DEVICE

TECHNICAL FIELD

The present invention relates to an in-vehicle charging apparatus configured to charge a storage battery serving as the power source of a vehicle such as an electric vehicle, using a power supply of a house, for example.

BACKGROUND ART

In recent years, charging of storage batteries installed in a vehicle such as an electric vehicle using a power supply of a house (house of the owner of the vehicle) has been in practice. Since the power supply of a house supplies power to various electric devices such as an air conditioner, an overcurrent flowing through a power supply circuit may be caused by, for example, an increase in the number of electric devices in use. When an overcurrent occurs, the power supply circuit is shut off to stop supply of the power to the electric devices, thus making all the electric devices temporarily unusable.

Conventionally, electric device systems configured to reduce a current amount according to a decrease in a receiving voltage have been known as a method of preventing an overcurrent flowing through a power supply circuit in a house (for example, Patent Literature (hereinafter, abbreviated as PTL) 1). In an electric device system of PTL 1, when a decrease in a receiving voltage is detected by a voltage detector, a current amount in the entire system is reduced by controlling a power converter according to this decrease.

CITATION LIST

Patent Literature

PTL 1
Japanese Patent Application Laid-Open No. 2003-92829

SUMMARY OF INVENTION

Technical Problem

The system according to PTL 1, however, reduces a current amount of the system without taking into consideration a current amount for other electric devices in use. As a result, the occurrence of overcurrent due to a current used in the entire system involves a problem in that all the electric devices become temporarily unusable because the power supply circuit is shut off.

It is an object of the present invention to provide an in-vehicle charging apparatus capable of preventing an in-vehicle charger from becoming unable to perform charge and also preventing an unusable state of another electric device in a house or the like by decreasing the input current of the in-vehicle charger when the use of the other electric device is started during the charge in the house or the like.

Solution to Problem

An in-vehicle charging apparatus according to an aspect of the present invention is an apparatus installed in a vehicle and configured to charge a storage battery installed in the vehicle, using a power source that is connected to an electric device and that is provided outside the vehicle, the apparatus including: a charger that receives a variable input current value flowing from the power source for charging the storage battery; a measurement section that measures the input current value of the charger and an input voltage value on the side of the power source of the charger; and a control section that controls the input current value of the charger, in which: the control section varies the input current value of the charger into a plurality of values, and calculates a correspondence between the input current values measured by the measurement section during the varying, and input voltage values corresponding to the respective input current values; and the control section controls, when an input voltage value varies while the input current value measured by the measurement section remains the same during charge of the storage battery, the input current value of the charger so that the input current value of the charger corresponds to the input voltage value before the varying, based on the correspondence.

Advantageous Effects of Invention

According to the present invention, it is possible to prevent an in-vehicle charger from becoming unable to perform charge and also to prevent an unusable state of another electric device in a house or the like by decreasing the input current of the in-vehicle charger when the use of the other electric device is started during the charge in the house or the like.

DESCRIPTION OF EMBODIMENTS

Hereinafter, embodiments of the present invention will be described in detail with reference to the accompanying drawings.

Embodiments

<Configuration of Charging System>

Figure 1:
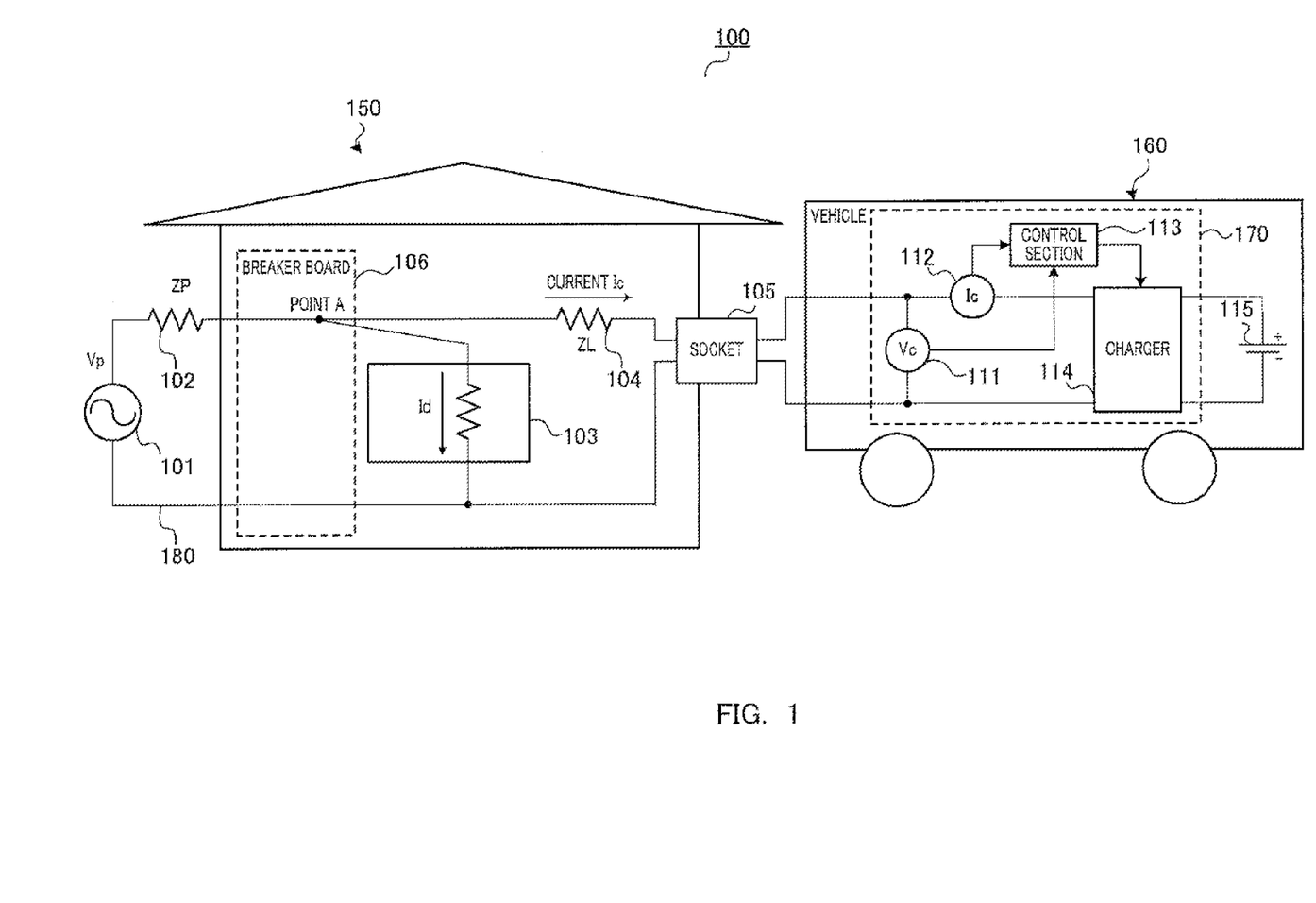
FIG. 1 illustrates a configuration of a charging system according to an embodiment of the present invention.

FIG. 1 illustrates a configuration of charging system 100 according to an embodiment of the present invention.

House 150 is a house of the owner of vehicle 160, for example. House 150 includes socket 105 connected to in-vehicle charging apparatus 170 of vehicle 160. House 150 has power supply circuit 180 that supplies a power supply current from power source 101. House 150 includes breaker board 106 that shuts off power supply circuit 180 when an overcurrent flows through power supply circuit 180.

Vehicle 160 charges storage battery 115 installed in vehicle 160, by in-vehicle charging apparatus 170 connected to socket 105, using power source 101 supplied to the inside of house 150 from, for example, a power plant. Vehicle 160 is an electric vehicle which runs using storage battery 115 as a driving source.

In-vehicle charging apparatus 170 charges storage battery 115 installed in vehicle 160. A configuration of in-vehicle charging apparatus 170 will be described below in detail.

Power supply circuit 180 includes power source 101, output impedance 102 of power source 101, and impedance 104 of the wiring which connects power source 101 and charger 114. Power supply circuit 180 is a circuit for supplying a power source from power source 101 to electric device 103 or in-vehicle charging apparatus 170.

<Configuration of In-Vehicle Charging Apparatus>

In-vehicle charging apparatus 170 has voltage measurement section 111, current measurement section 112, control section 113, and charger 114.

Voltage measurement section 111 measures the input voltage of charger 114 and outputs the measured voltage value to control section 113.

Current measurement section 112 measures the input current of charger 114 corresponding to the input voltage of charger 114 and outputs the measured current value to control section 113.

Control section 113 finds for the relationship between the plurality of measured voltage values inputted from voltage measurement section 111 and the plurality of measured current values corresponding to the plurality of respective measured voltage values inputted from current measurement section 112 as a first-order approximation straight line, and stores the found values as a table. Control section 113 controls the input current of charger 114 according to the table of the found first-order approximation straight line. A method of finding a first-order approximation straight line and a control method of the input current during the charge will be described below.

Charger 114 charges storage battery 115 with an input current controlled by control section 113, using power source 101.

<Method of Finding First-Order Approximation Straight Line>

Figure 2:
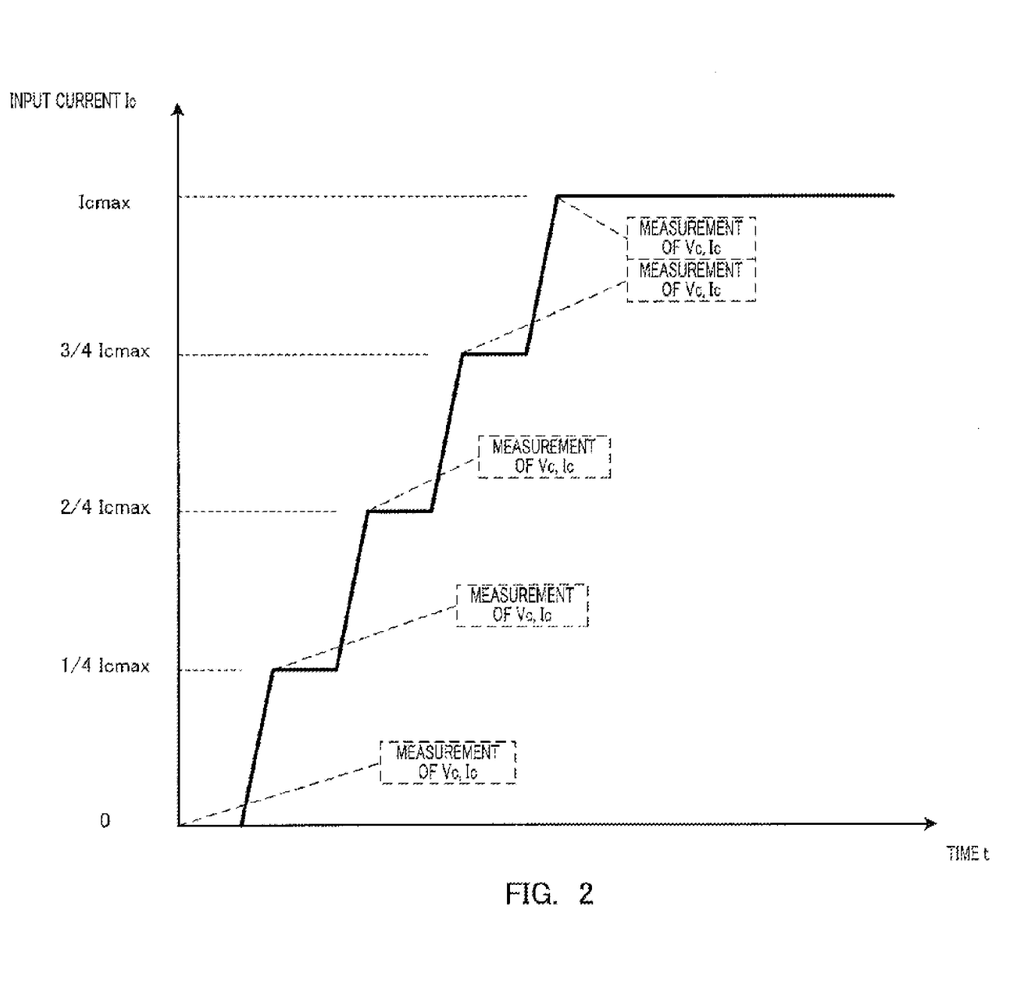
FIG. 2 illustrates the relationship between time and an input current in a method of finding the relationship between an input voltage and an input current as a first-order approximation straight line according to the embodiment of the present invention.
Figure 3:
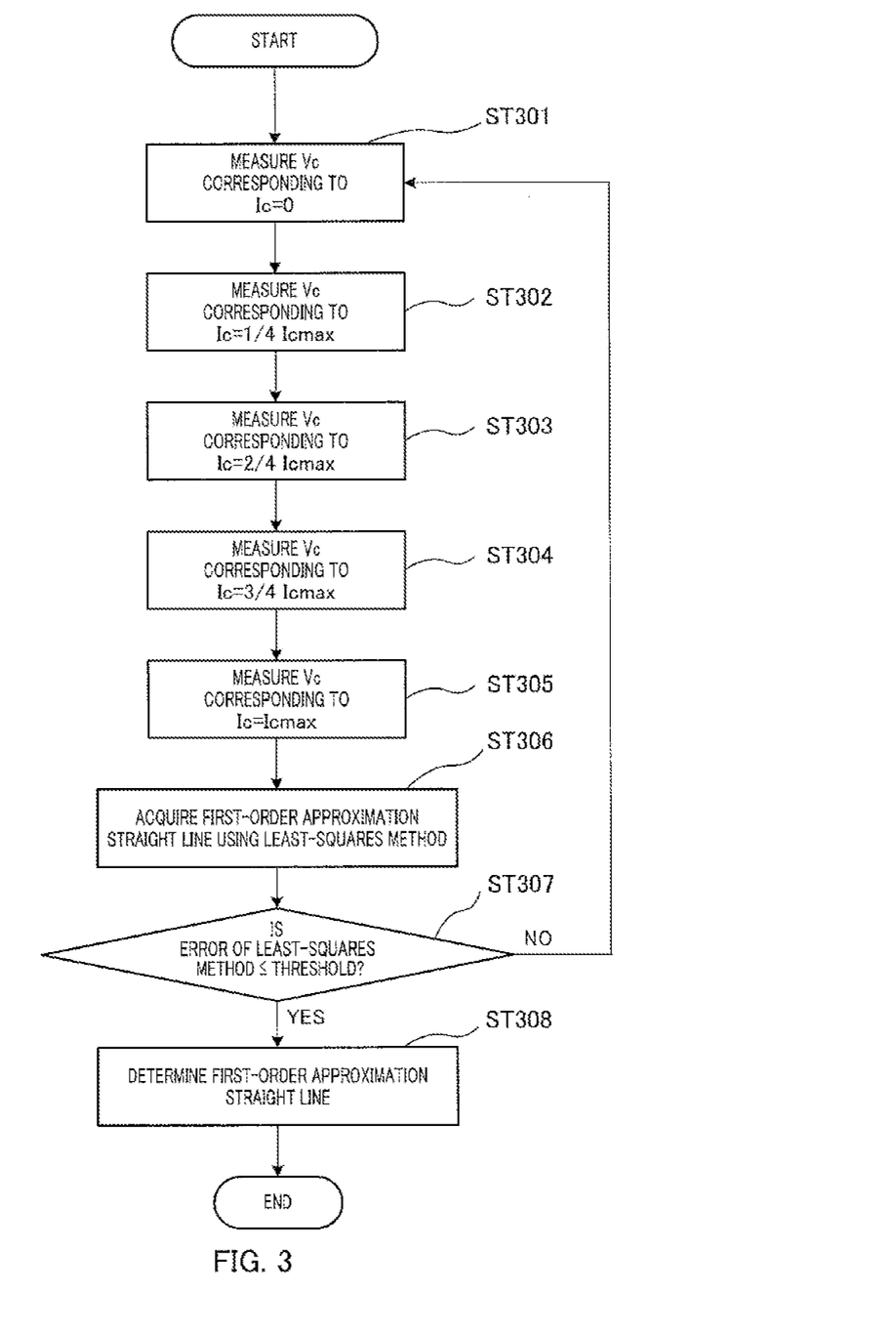
FIG. 3 is a flowchart illustrating how to find a first-order approximation straight line according to the embodiment of the present invention.
Figure 4:
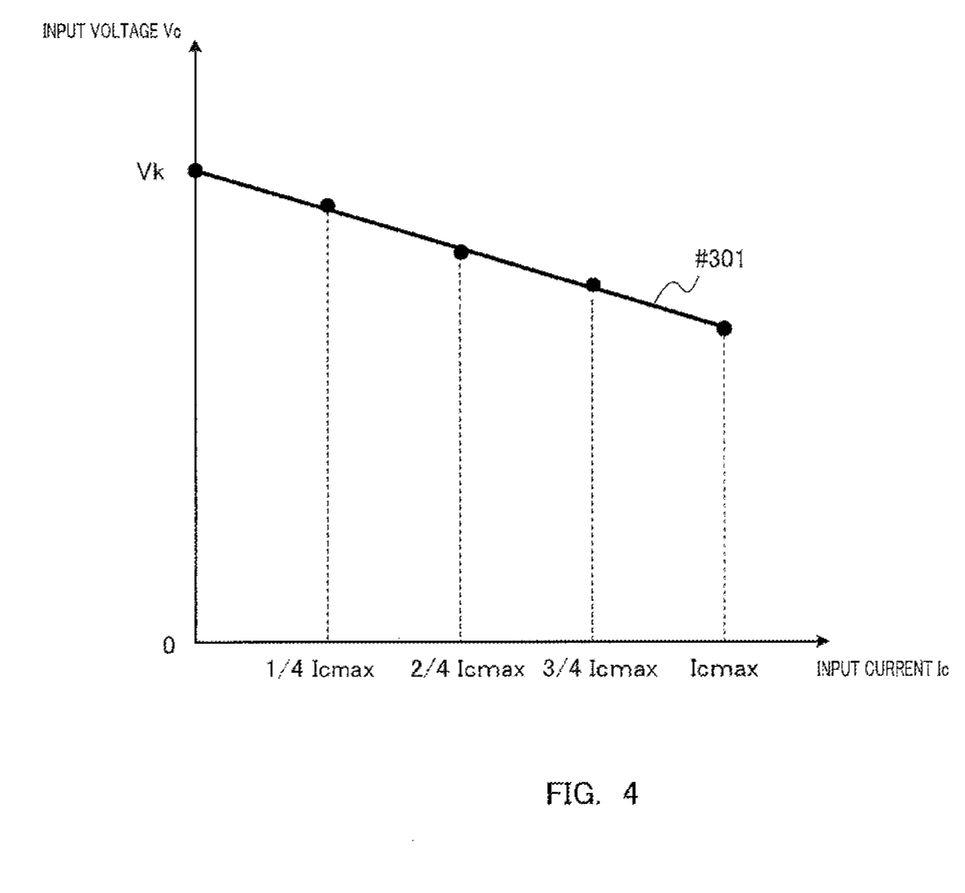
FIG. 4 illustrates the relationship between an input voltage and an input current on the found first-order approximation straight line according to the embodiment of the present invention.

FIG. 2 illustrates the relationship between time and an input current in a method of finding the relationship between an input voltage and an input current as a first-order approximation straight line. FIG. 3 is a flowchart illustrating how to find a first-order approximation straight line in the present embodiment. FIG. 4 illustrates the relationship between an input voltage and an input current on the found first-order approximation straight line.

Control section 113 finds a first-order approximation straight line, for example, before the start of charge.

Control section 113 varies input current Ic in sequence at predetermined time intervals and acquires the measured value of input voltage Vc at every timing of varying input current Ic. For example, as illustrated in FIG. 2, control section 113 varies input current Ic in sequence in order of "0," "¼ Icmax," "2/4 Icmax," "¾ Icmax," and "Icmax," and acquires the measured value of each input voltage Vc. Input current Ic and input voltage Vc which have been acquired are associated and stored in a table.

Specifically, as illustrated in FIG. 3, voltage measurement section 111 first measures input voltage Vc corresponding to input current Ic=0 (Step ST301).

Next, voltage measurement section 111 measures input voltage Vc corresponding to input current Ic=¼ Icmax (Step ST302).

Next, voltage measurement section 111 measures input voltage Vc corresponding to input current Ic=2/4 Icmax (Step ST303).

Next, voltage measurement section 111 measures input voltage Vc corresponding to input current Ic=¾ Icmax (Step ST304).

Next, voltage measurement section 111 measures input voltage Vc corresponding to input current Ic=Icmax (Step ST305).

Next, control section 113 acquires input current Ic and input voltage Vc in each of Steps ST301 to ST304, and finds the relationship between input current Ic and input voltage Vc which are acquired as a first-order approximation straight line using the least-squares method (Step ST306).

Next, control section 113 determines whether the error of the least-squares method used for finding the first-order approximation straight line is equal to or less than a constant value (Step ST307).

When the error of the least-squares method is equal to or less than the threshold (Step ST307: YES), and control section 113 determines the first-order approximation straight line found in Step ST306 (Step ST308), and complete the process.

On the other hand, when the error of the least-squares method is larger than a threshold value, (Step ST307: NO) control section 113 repeats the process of Steps ST301 to ST306.

With the above-described method, control section 113 finds the relationship between the value of each varied input current Ic and the measured value of each input voltage Vc corresponding to each input current Ic, as first-order approximation straight line #301 illustrated in FIG. 4. The method of finding first-order approximation straight line #301 is not limited to the least-squares method, and any other appropriate methods can be used.

The slope of first-order approximation straight line #301 is equal to synthetic impedance Zs (Zs=ZP+ZL) obtained by synthesizing output impedance ZP of power source 101 and impedance ZL of the wiring between power source 101 and charger 114.

<Control Method of Input Current of Charger During Charge>

When the amount of power used for electric device 103 in house 150 increases during the charge of in-vehicle charging apparatus 170, the input voltage to charger 114 declines as a result. In this case, the control is performed as follows.

Figure 5:
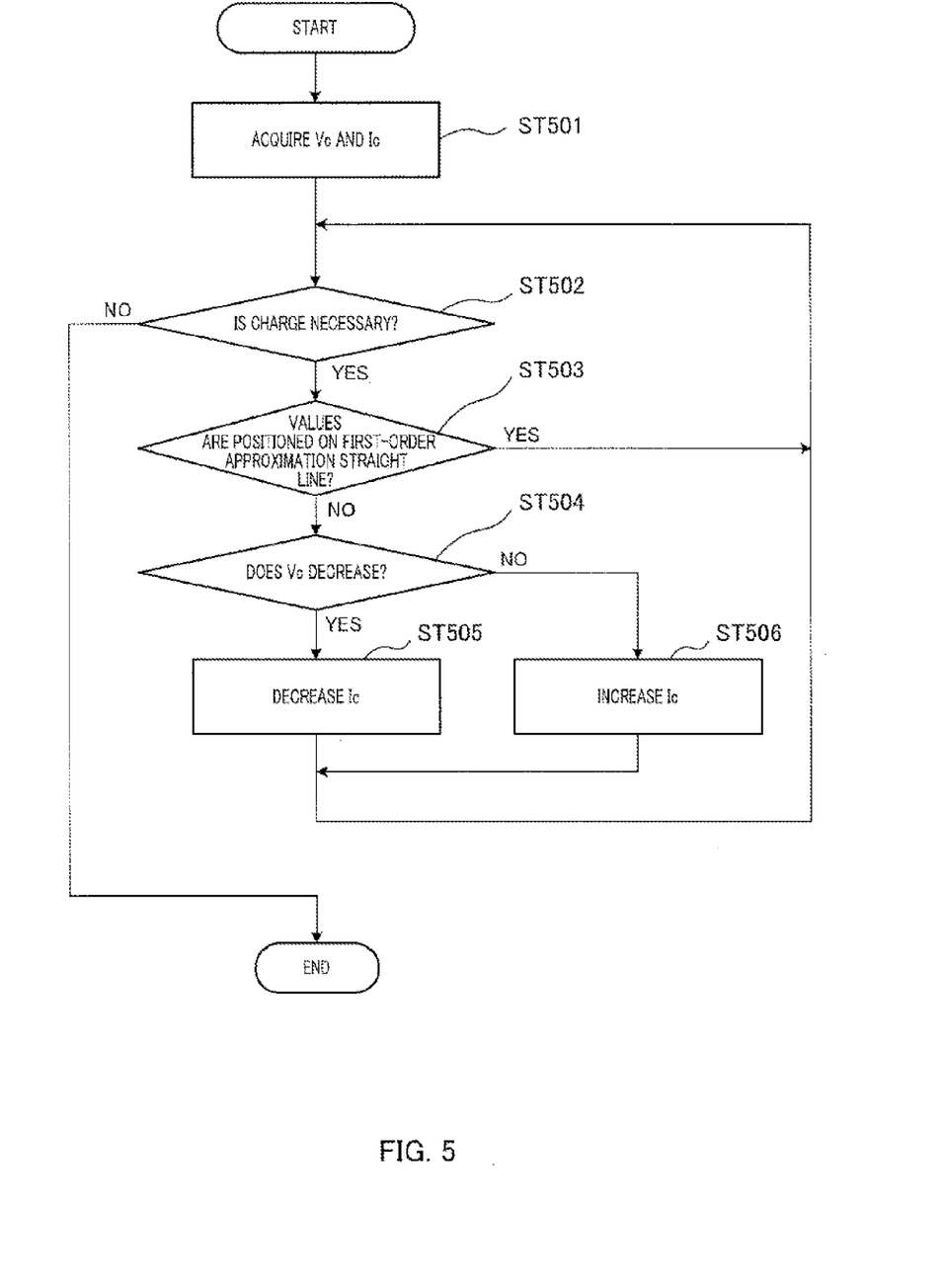
FIG. 5 is a flowchart illustrating a control method of the input current of a charger after the start of charge according to the embodiment of the present invention.
Figure 6:
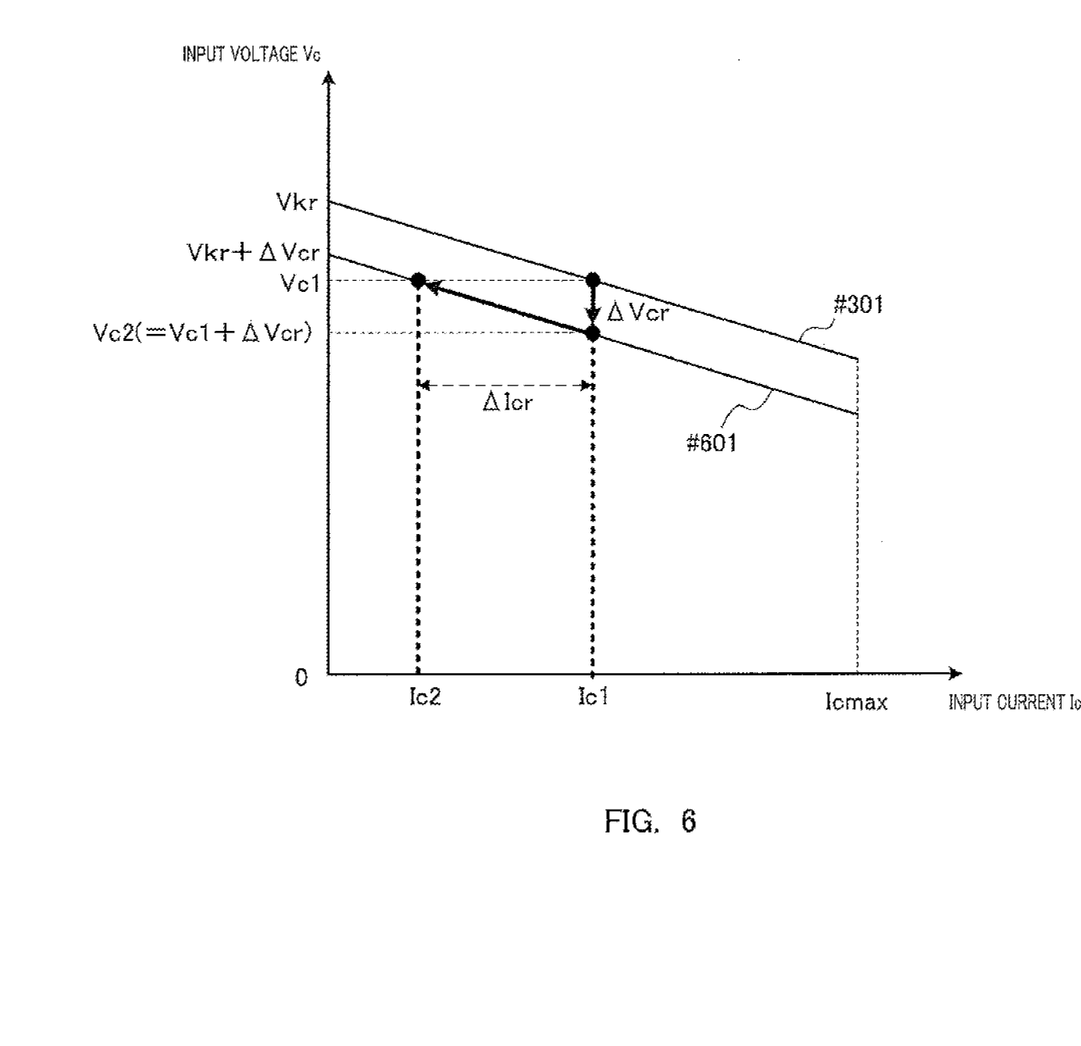
FIG. 6 illustrates a control for decreasing the input current of the charger after the start of charge according to the embodiment of the present invention.
Figure 7:
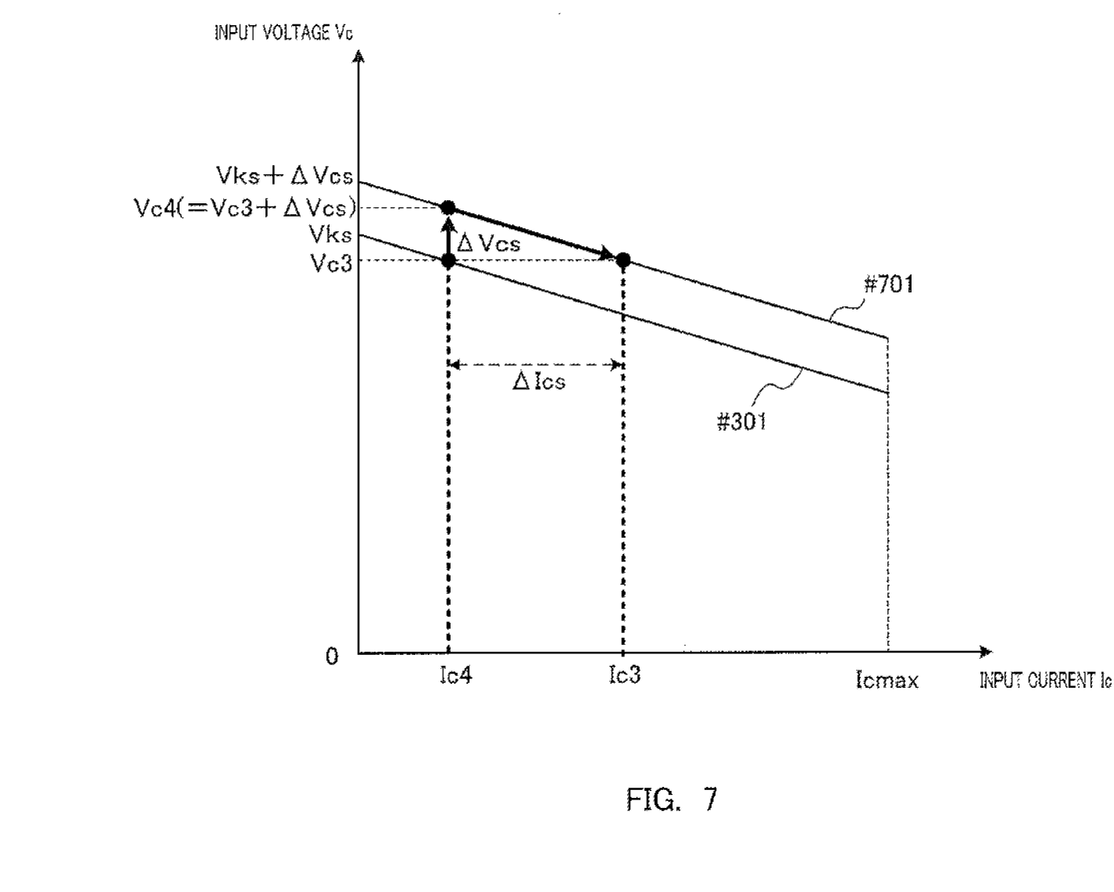
FIG. 7 illustrates a control for increasing the input current of the charger after the start of charge according to the embodiment of the present invention.

FIG. 5 is a flowchart illustrating a control method of the input current of charger 114 after the start of charge. FIG. 6 illustrates a control for decreasing the input current of charger 114 after the start of charge. FIG. 7 illustrates a control for increasing the input current of charger 114 after the start of charge.

In FIG. 6, Vc1 is the input voltage before the decrease, Vc2 is the input voltage after the decrease, Ic1 is the input current before the decrease, and Ic2 is the input current after the decrease. ΔVcr is a voltage reduction caused by an increase in load current Id flowing through electric device 103. ΔIcr is a current decreased by the control of control section 113. Vkr is the value of input voltage Vc at the intersection of first-order approximation straight line #301 and the vertical axis.

In FIG. 7, Vc3 is the input voltage before the increase, Vc4 is the input voltage after the increase, Ic3 is the input current before the increase, and Ic4 is the input current after the increase. ΔVcs is a voltage rise caused by a decrease in load current Id flowing through electric device 103. ΔIcs is a current increased by the control of control section 113. Vks is the value of input voltage Vc at the intersection of first-order approximation straight line #301 and the vertical axis.

Control section 113 controls the input current of charger 114 using first-order approximation straight line #301 beforehand found after the start of charge.

First, control section 113 acquires the measured value of input voltage Vc from voltage measurement section 111 and also acquires the measured value of input current Ic from current measurement section 112 (Step ST501).

Next, control section 113 determines whether the charge is necessary (Step ST502). For example, control section 113 determines that the charge is unnecessary when storage battery 115 is fully charged, and determines that the charge is necessary when storage battery 115 is not fully charged.

When determining that the charge is unnecessary (Step ST502: NO), control section 113 completes the process.

On the other hand, when determining that the charge is necessary (Step ST502: YES), control section 113 determines whether the acquired measured value of the input voltage and the acquired measured value of the input current are positioned on first-order approximation straight line #301 (Step ST503).

When the input voltage is stable and the values are positioned on first-order approximation straight line #301 (Step ST503: YES), an overcurrent does not flow through power supply circuit 180 even if the input current of charger 114 is not adjusted. Control section 113 therefore returns to the process of Step ST502.

On the other hand, when the values are not positioned on first-order approximation straight line #301 (Step ST503: NO), control section 113 determines whether input voltage Vc decreases (Step ST504).

When input voltage Vc decreases (Step ST504: YES), control section 113 controls charger 114 so as to decrease input current Ic according to first-order approximation straight line #301 (Step ST505).

Specifically, as illustrated in FIG. 6, assuming that input current Ic is constant when input voltage Vc decreases from Vc1 to Vc2, control straight line #601 is found which has the same slope as that of first-order approximation straight line #301 and passes through input voltage Vc2 after the decrease. Control section 113 controls charger 114 so as to decrease input current from Ic1 so that the input voltage on found control straight line #601 is substantially equal to input voltage Vc1 before the decrease. Here, input voltage Vc substantially equal to input voltage Vc1 is equal to or more than input voltage Vc1 and equal to or less than a value larger than input voltage Vc by predetermined value α (where α>0) (Vc1≤Vc≤(Vc1+α)). This is a concept including a control for decreasing input current from Ic1 to an input current corresponding to a voltage higher than input voltage Vc1 before the decrease by predetermined value α.

On the other hand, when input voltage Vc does not decrease (Step ST504: NO), control section 113 controls charger 114 so as to increase input current Ic (Step ST506).

Specifically, as illustrated in FIG. 7, assuming that input current Ic is constant when input voltage Vc increases from Vc3 to Vc4, control straight line #701 is found which has the same slope as that of first-order approximation straight line #301 and passes through input voltage Vc4 after the increase. Control section 113 controls charger 114 so as to increase the input current from Ic4 so that the input voltage on found control straight line #701 is substantially equal to input voltage Vc3 before the increase. However, at this time, control section 113 controls the input current so as not to be equal to or more than maximum allowable current value Icmax. Here, input voltage Vc substantially equal to input voltage Vc3 is equal to or less than input voltage Vc3 and equal to or more than a value smaller than input voltage Vc by predetermined value β (where β>0) (Vc3≥Vc≥(Vc3−β)). This is a concept including a control for increasing the input current from Ic4 to an input current corresponding to a voltage lower than input voltage Vc3 before the increase by predetermined value β.

Alternatively, in FIG. 5, the process in Step ST502, which is to determine whether the charge is necessary may be performed, and after it is determined that the charge is necessary, the process in Step ST501, which is to acquire the measured value of input voltage Vc from voltage measurement section 111 and the measured value of input current Ic from current measurement section 112, may be performed.

<Specific Example of Controlling to Decrease Input Current Ic1 to Input Current Ic2>

With reference to FIG. 5, an example case will be described in which in-vehicle charging apparatus 170 starts the charge for storage battery 115 using power source 101 when electric device 103 is stopped, and then electric device 103 starts to operate by receiving power supplied from power source 101.

Voltage reduction ΔVc caused by the start of operation of electric device 103 can be found by Equation 1.

[1]
$$\Delta Vc = ZP * \Delta Id \quad \text{(Equation 1)}$$

where Id is a current flowing through electric device 103, and
ZP is the output impedance of power source 101.

Control section 113 decreases input current Ic to compensate the influence of voltage reduction ΔVc found from Equation 1.

Here, input voltage Ve can be found by Equation 2.

[2]
$$Vc = Vp - ZP(Ic + Id) - ZL * Ic \quad \text{(Equation 2)}$$

where Vp is the voltage of power source 101,
Ic is a current flowing from point A (refer to FIG. 1) of breaker board 106 to charger 114,
Id is a current flowing through electric device 103,
ZP is the output impedance of power source 101, and
ZL is the impedance of wiring between power source 101 and charger 114.

Equation 2 is modified to give input voltage Vc by Equation 3.

[3]
$$Vc = (Vp - ZP * Id) - ZS * Ic \quad \text{(Equation 3)}$$

where Zs is the synthetic impedance of ZP and ZL.

Output voltage Vk of breaker board 106 for input current Ic=0 can be found by Equation 4.

[4]
$$Vk = Vp - ZP * Id \quad \text{(Equation 4)}$$

where Vp is the voltage of power source 101,
Id is a current flowing through electric device 103, and
ZP is the output impedance of power source 101.

Equation 4 is substituted for Equation 3 to obtain Equation 5.

[5]
$$Vc = Vk - Zs * Ic \quad \text{(Equation 5)}$$

From Equation 5, input voltage Vc1 before the decrease and input voltage Vc2 after the decrease are obtained by Equations 6 and 7, respectively.

[6]
$$Vc1=Vk-ZS*Ic1 \quad \text{(Equation 6)}$$

[7]
$$Vc2=Vk-ZS*Ic2 \quad \text{(Equation 7)}$$

Since voltage reduction $\Delta Vc=Vc2-Vc1$, Equation 6 is subtracted from Equation 7 to thereby obtain voltage reduction $\Delta Vc$ by Equation 8.

$$\Delta Vc=-ZS*\Delta Ic \quad \text{(Equation 8)}$$

Equation 8 can be modified to obtain Equation 9.

[9]
$$\Delta Ic=-\Delta Vc/ZS \quad \text{(Equation 9)}$$

Therefore, decrease amount $\Delta Ic$ of input current Ic compensating the influence of voltage reduction $\Delta Vc$ can be found by Equation 9.

Here, Equation 1 is substituted for Equation 9 to obtain Equation 10.

[10]
$$\Delta Id=-(ZS/ZP)*\Delta Ic \quad \text{(Equation 10)}$$

From Equation 10, since $(ZS/ZP) \geq 1$, $\Delta Ic \leq \Delta Id$. Therefore, a decrease amount of $\Delta Ic$ can be increased according to an increase in $\Delta Id$, and an increase amount of $\Delta Ic$ can be increased according to a decrease in $\Delta Id$.

Advantageous Effects of Present Embodiment

As described above, in the present embodiment, the relationship between the input voltage and the input current of the charger is found as a first-order approximation straight line before the start of charge, and thereby, the input current of the charger is controlled according to the first-order approximation straight line after the start of charge. Thereby, according to the present embodiment, it is possible to prevent an in-vehicle charger from becoming unable to perform charge and also to prevent an unusable state of another electric device by decreasing the input current of the in-vehicle charger after the use of the other electric device is started during the charge.

According to the present embodiment, an input current is reduced according to a decrease in an input voltage caused by the start of the use of another electric device during the charge, and an input current is increased according to an increase in an input voltage caused by the stop of the use of the other electric device during the charge. As a result, charging with a maximum input current usable for charge can be used for the charge.

According to the present embodiment, a first-order approximation straight line is found again when a large error is caused from the least-squares method used for finding a first-order approximation straight line. Thereby, according to the present embodiment, it is possible to avoid finding an inaccurate first-order approximation straight line due to a variation in an input voltage caused by the start or stop of operation of another electric device while a first-order approximation straight line is found.

Variations of Present Embodiment

In the above-described embodiment, a control that decreases or increases the input current of charger 114 by a single level is performed. However, the present invention is not limited to this configuration, and a control that decreases or increases the input current of charger 114 by a plurality of levels may be performed.

In the above-described embodiment, a first-order approximation straight line is found before the start of charge, and the input current of the charger is controlled according to the first-order approximation straight line after the start of the charge. However, the present invention is not limited to this configuration, and a first-order approximation straight line may be found at predetermined timing after the start of charge.

The disclosure of Japanese Patent Application No. 2011-75791, filed on Mar. 30, 2011, including the specification, drawings and abstract, is incorporated herein by reference in its entirety.

INDUSTRIAL APPLICABILITY

An in-vehicle charging apparatus according to the present invention is suitable for charging a storage battery serving as the power source of a vehicle such as an electric vehicle, using the power supply of a house, for example.

REFERENCE SIGNS LIST

100 Charging system
101 Power source
102 Output impedance
103 Electric device
104 Impedance
105 Socket
106 Breaker board
111 Voltage measurement section
112 Current measurement section
113 Control section
114 Charger
115 Storage battery
150 House
160 Vehicle
170 In-vehicle charging apparatus
180 Power supply circuit

The invention claimed is:

1. An in-vehicle charging apparatus installed in a vehicle and configured to charge a storage battery installed in the vehicle, using a power source that is connected to an electric device and that is provided outside the vehicle, the apparatus comprising:
   a charger that receives a variable input current value flowing from the power source for charging the storage battery;
   a measurement section that measures the input current value of the charger and an input voltage value on the side of the power source of the charger; and
   a control section that controls the input current value of the charger, wherein:
   the control section varies the input current value of the charger into a plurality of values, and calculates a correspondence between the input current values measured by the measurement section during the varying, and input voltage values corresponding to the respective input current values; and
   the control section controls, when an input voltage value varies while the input current value measured by the measurement section remains the same during charge of the storage battery, the input current value of the charger so that the input current value of the charger corresponds to the input voltage value before the varying, based on the correspondence.

2. The in-vehicle charging apparatus according to claim 1, wherein the control section controls the input current value of the charger by a single level so that the input current value of the charger corresponds to the input voltage value before the varying.

3. The in-vehicle charging apparatus according to claim 1, wherein the control section calculates the correspondence between the input current values and the input voltage values measured by the measurement section, as a first-order approximation straight line, then finds, when the input voltage value varies while the input current value measured by the measurement section remains the same during charge of the storage battery, a control straight line that has the same slope as the first-order approximation straight line and that passes through the input current value measured by the measurement section and the input voltage value after the varying, and controls the input current value of the charger by a single level so that the input current value of the charger corresponds to the input voltage value before the varying on the control straight line.

4. The in-vehicle charging apparatus according to claim 3, wherein:
the control section finds, when the input voltage value decreases while the input current value measured by the measurement section remains the same during charge of the storage battery, a control straight line that has the same slope as the first-order approximation straight line and that passes through the input current value measured by the measurement section and the input voltage value after the decrease, and performs a control that decreases the input current value of the charger by a single level so that the input current value of the charger corresponds to the input voltage value before the decrease on the control straight line; and the control section finds, when the input voltage value increases while the input current value measured by the measurement section remains the same during charge of the storage battery, a control straight line that has the same slope as the first-order approximation straight line and that passes through the input current value measured by the measurement section and the input voltage value after the increase, and performs a control that increases the input current value of the charger by a single level so that the input current value of the charger corresponds to the input voltage value before the increase on the control straight line.

5. The in-vehicle charging apparatus according to claim 3, wherein the control section finds the first-order approximation straight line, using a least-squares method.

6. The in-vehicle charging apparatus according to claim 5, wherein the control section finds, when an error in the least-squares method is larger than a threshold, a correspondence between input current values and input voltage values newly measured by the measurement section, as the first-order approximation straight line again.

* * * * *